United States Patent [19]
Bowman et al.

[11] Patent Number: 5,467,565
[45] Date of Patent: Nov. 21, 1995

[54] METHOD AND APPARATUS FOR IMPROVED ACTIVATION OF SERVICES IN AN OFFICE BUILDING FLOOR

[75] Inventors: Timothy Bowman, Parkersburg, W. Va.; Charles N. Domigan, Coolville, Ohio; Robert W. Hadfield, Parkersburg, W. Va.; J. David Harmon, Vienna, W. Va.; James E. Sheridan, Williamstown, W. Va.

[73] Assignee: Walker Systems, Inc., Parkersburg, W. Va.

[21] Appl. No.: 850,530

[22] Filed: Mar. 13, 1992

(Under 37 CFR 1.47)

Related U.S. Application Data

[63] Continuation-in-part of Ser. No. 659,528, Feb. 22, 1991, abandoned, which is a continuation of Ser. No. 455,083, Dec. 22, 1989, abandoned.

[51] Int. Cl.⁶ ..................... E04B 5/48
[52] U.S. Cl. ................ 52/220.1; 52/220.8; 174/49
[58] Field of Search ............ 52/99, 100, 220.1, 52/220.2, 220.5, 220.8, 741.1; 174/48, 49

[56] References Cited

U.S. PATENT DOCUMENTS

| | | | |
|---|---|---|---|
| 3,932,696 | 1/1976 | Fork et al. | 174/48 |
| 3,973,366 | 8/1976 | Balane et al. | 52/99 |
| 4,012,874 | 3/1977 | Brogan et al. | 52/99 |
| 4,529,833 | 7/1985 | Weis | 174/48 |
| 5,195,288 | 3/1993 | Penczak | 52/220.1 |

*Primary Examiner*—Carl D. Friedman
*Assistant Examiner*—Kien Nguyen
*Attorney, Agent, or Firm*—McAndrews, Held & Malloy, Ltd.

[57] ABSTRACT

This patent discloses a method and apparatus for activation of services in a concrete floor of an office building from below floor slab distribution systems. Void-forming boxes that are secured to a conventional metal deck sheet and surrounded by the concrete floor slab provide chambers in which in-floor activations are mounted. An insulating block in the void-forming box restores fire resistance, prior to installation of an activation kit, that is lost by displacement of concrete by the void-forming box. An in-floor activation kit may be installed within the void-forming box and connected to a below floor slab distribution system through an activation opening cut in the metal deck sheet. Connection hardware is secured to the metal deck sheet for connection to a conventional below-floor slab service distribution system providing communication from the interior of the void-forming box to the below-floor slab service distribution system. Void-forming boxes mounted to the metal deck sheet may be connected by conduit in a conventional manner allowing conductors to be routed from a void-forming box connected to a below floor slab service distribution system to another void-forming box through connecting conduit.

5 Claims, 5 Drawing Sheets

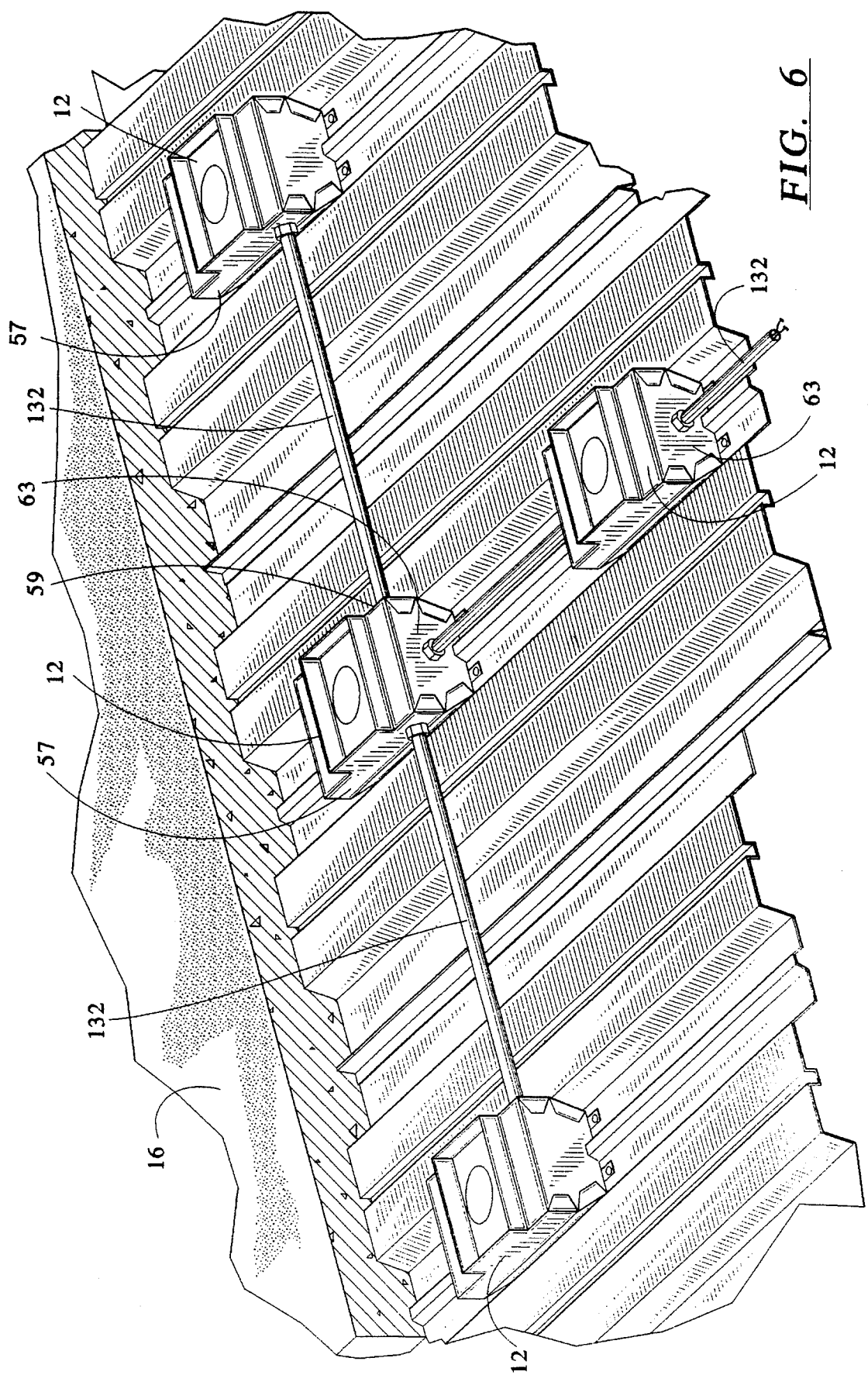

5,467,565

METHOD AND APPARATUS FOR IMPROVED ACTIVATION OF SERVICES IN AN OFFICE BUILDING FLOOR

This application is a continuation-in-part of application Ser. No. 659,528, filed Feb. 22, 1991, which was a continuation of application Ser. No. 455,083 filed Dec. 22, 1989, both now abandoned.

BACKGROUND OF THE INVENTION

The present invention relates to providing access to electric power, communications, and computer data services in a concrete floor of an office building, and more particularly, to providing user access to such services from a below floor slab distribution system by recessed and flush service activations.

Occupants of a modern office building generally require electric power, communication, and computer data services in various combinations, at a number of locations. Services are provided to the required locations by service distribution systems that are generally partially or entirely disposed within a concrete floor.

In-floor service distribution systems, such as ducts or cellular deck are cast into a concrete floor slab and require a relatively large initial investment at the time of construction. In addition, the capacity of such distribution systems must be determined before construction of the floor. The designed capacity may turn out not to be needed or may eventually be insufficient.

A distribution system that is assembled below the concrete slab and supporting deck sheet of a conventional concrete floor is independent of the floor, and can be expanded as needs arise. A conventional below floor slab system extends into the floor only through holes at which connection to the distribution system is required. These holes may be formed by opening core presets cast into the floor, or by boring through the concrete floor.

Activations, (including connectors connected to the distribution system or passages for routing conductors from the distribution system to locations above the floor, or both) provide access to service distribution systems. In-floor activations are assembled in activation presets in the floor through an opening in the floor surface. Activation presets are conventionally cast into the concrete slab overlying an in-floor distribution system providing a chamber within which connectors and other hardware may be assembled.

Floor fittings are activations that are positioned on the floor surface and are connected to a distribution system through holes extending to a distribution system in the floor or through the floor to a below floor slab distribution system. Floor fittings are most commonly used with below floor slab distribution systems and less commonly with in-floor distribution systems. Floor fitting activations have conventionally offered fewer activation configurations and fewer connections than in floor activations. Larger floor fittings now offer a larger number of connections, but occupy a larger area on the floor than conventional floor fittings.

Flush poke-through are activations that position connectors generally within the plane of the floor surface in a hole that extends into the concrete floor slab. Flush poke-throughs are generally positioned in holes bored into the floor and provide a small number of connections.

Presets are void forming structures that are cast into concrete floor slabs to provide access to distribution systems. A preset typically defines a chamber and has an opening at its upper end which is disposed close below the floor surface. A preset cap is placed over the preset to prevent concrete from filling the preset when the floor slab is being poured. Service distribution systems are conventionally accessed at a preset by removing (breaking away) the concrete overlying the preset cap.

Core presets are used to provide access to a single duct, raceway, or a below floor slab distribution system. In the case of a core preset overlying an in-floor distribution system, the core insert conventionally includes a service insert extending toward the floor surface from a duct or cell and to which a floor fitting can be secured. In the case of a core preset extending through a floor for connection to a below floor slab distribution system, the entire core present is removed leaving a hole into which a "poke-through" is positioned. A floor fitting is then secured to the poke-through.

Conventional activation presets overlie more than one raceway cell or duct of an in-floor distribution system. Activation presets are sized and constructed to accept an activation kit including connectors, shields, and other activation hardware. Typically, any one of a number of different activation kits may be installed in an activation preset to provide several possible connection configurations for the services.

Connection of a floor fitting to a distribution system requires one or more holes through which conductors are routed from the distribution system to the floor fitting. These holes are conventionally formed by either a core preset or boring a hole to an in-floor system, or, through the floor. Boring a hole in the floor to a distribution system is time-consuming, messy, and more expensive than removal of an insert preset. In the case of a below floor slab system, extending the distribution system, pulling connectors through the distribution system to the hole, and installing the poke-through are relatively expensive compared to installation of an activation kit in a service insert and pulling connectors from an in-floor system.

Floor fittings conventionally provide limited options for access to more than one service. A multi-service floor fitting and a poke-through having shields that separate conductors for different services provide activation of more than one service from a below floor slab distribution system through a single hole. A small number of connections to each service are provided, as compared to a multi-service preset activations utilized in in-floor systems. If more connections are required than can be provided by a single hole, separate single service poke-throughs and floor fittings are generally used. Multiple holes and service inserts are conventionally required for floor fittings to provide access to multiple services distributed by in-floor systems. Less commonly, a floor fitting may be mounted to a present overlying more than one duct or cell to provide connections to multiple services.

In addition to service and installation considerations, building fire codes affect construction of and connection to service distribution systems. Office building floors (including those in which service distribution systems and activations are installed), must prevent smoke, flame, and heat from spreading through the floor, that is, from one side of the floor to the other, for the period of time specified by building codes. Office building floors are typically an assembly including a metal deck sheet and an overlying concrete slab. A sufficiently thick concrete slab may be provided to achieve the required fire resistance. When the concrete does not provide the required fire resistance, the floor assembly may include insulation sprayed onto the underside of the metal deck sheet to increase the fire resistance of the floor assembly.

Service distribution systems and activations must be compatible with the floor's fire-proofing as well as the floor's structure and must maintain the required fire resistance. The various service distribution systems and activations differently affect the fire resistance of floor assemblies. In-floor distribution systems decrease the amount of concrete in the slab and provide metal heat conduction paths through the distribution system and presets from a location at or near the deck sheet to the upper surface of the floor. Floor assemblies having in-floor service distribution systems, particularly cellular raceway, conventionally require a greater amount of sprayed-on insulation to satisfy fire resistance requirements than solid concrete floors. The cost of an in-floor distribution system includes the cost of this additional insulation.

A below floor slab service distribution system is generally not part of the floor and consequently affects the fire resistance of the floor only at locations at which services are routed through the floor from the below floor slab distribution system. A below floor slab distribution system may be constructed after construction of the floor assembly in the space below the floor (and often above the dropped ceiling of the next lower floor). Consequently, the number of services and the number and location of connections to the services are selected after construction.

Connection to a below floor slab distribution system requires that holes be made through the floors compromising the fire resistance of the floor assembly. Poke-throughs have fire-resistance components that surround the conductors extending through the hole and restore the fire resistance of the floor.

Floors overlying below floor slab service distribution systems are conventionally constructed to achieve the required fire resistance without regard to the service distribution system. Core presets providing access to below floor slab distribution systems are made of materials, filled with materials that do not conduct heat well, or both and do not compromise the fire resistance of the floor assembly. Therefore, no additional floor fire-proofing is required as a result of the presence of these core presets. However, removal of core presets requires installation of fire resistance components, such as poke-throughs, with the service activation, increasing the cost of providing service activation.

Accordingly, a need exists for an activation for below floor slab service distribution system that provides more connections than conventional floor fittings, does not require a large fitting extending from the floor surface, allows connection to multiple services, and retains the benefits of low cost at time of construction. In addition, a need exists for an activation for a below floor slab distribution system: that provides connectors and routes for conductors for more than one service while maintaining the necessary separation of services; that allows connectors to be positioned flush with the floor surface or recessed in a void in the floor; and that provides increased access to below floor slab service distribution systems while not increasing the fire protection measures required to satisfy building codes.

SUMMARY OF THE INVENTION

This invention is directed to an improved method and apparatus for providing an in-floor activation for a service distribution system that is disposed beneath a concrete floor slab overlying a corrugated or fluted metal deck sheet. The invention overcomes the disadvantages of prior a activations for below floor slab service distribution systems described above.

The apparatus of the present invention includes a void-forming box that defines an interior volume in the concrete floor slab. This volume is sized so that it may receive connectors, mounting hardware, and shields for separating services. The void-forming box is positioned on the corrugated or fluted metal deck sheet prior to pouring a concrete slab. It has spaced apart end walls and spaced apart side walls. Each of these walls has a lower edge that conforms to the profile of the corrugated or fluted metal deck sheet. The side walls join and extend between the spaced apart end walls so as to circumscribe a void-bounding region of the deck sheet.

The end and side walls extend upwardly from the corrugated or fluted deck sheet to upper edges at a location below the floor surface of the concrete slab. The void-forming box also has a top that overlies the upper edges of the end and side walls and defines an activation opening. This opening is sized to permit the facile introduction of connectors, mounting hardware, and shields into the interior volume of the void-forming box. A removable closure member overlies and closes the activation opening. The void-bounding region of the deck sheet, side walls, end walls, top, and closure member define the interior volume of the void-forming box. An insulation pad is positioned within the void-forming box before the box is positioned on the deck sheet. The insulation pad provides resistance to heat transfer through the void forming box. A pad may be used which, when subjected to heat as from a fire, will expand and partially fill the interior volume.

The present invention further includes hardware for providing access to the interior of the void-forming box from above the floor, as well as hardware for connection to the below floor slab distribution system. This latter hardware maintains separation of conductors from different services and enhances fire resistance by providing insulating components and acting as a heat radiator to dissipate heat at the floor surface. The fire resistance components restore the fire resistance that is lost by the removal of the insulation pad.

Accordingly, it is an object of the present invention to provide an in-floor activation for a below floor slab service distribution system that permits a larger number of connections to a service than are provided by conventional floor fittings.

Another object of the present invention is to provide an in-floor activation for connection to more than one below floor slab service distribution system.

Yet another object of the present invention is to provide an in-floor activation for one or more below floor slab service distribution systems that does not require increased fire protection of the floor.

It is a further object of the present invention to provide access to a larger number of connections to one or more below floor slab service distribution systems at an activation location than are provided by conventional floor fittings.

These and other objects and advantages of the present invention, as well as details of the preferred embodiment thereof, will be more fully understood from the following description and the drawings.

BRIEF DESCRIPTION OF THE DRAWINGS

FIG. 6 is a perspective view of void-forming boxes according to the present invention mounted on a corrugated metal deck sheet and conduit providing conductor carrying communication between void-forming boxes.

In the following detailed description, spatially orienting terms are used, such as "left," "right," "upward," "downward," and the like It is to be understood that these terms are used for convenience of description of the preferred embodiments by reference to the drawings. Unless so specified, these terms do not necessarily describe the absolute location in space, such as left, right, upward, downward, etc, that any part must assume.

DESCRIPTION OF THE PREFERRED EMBODIMENT

Figure 1:
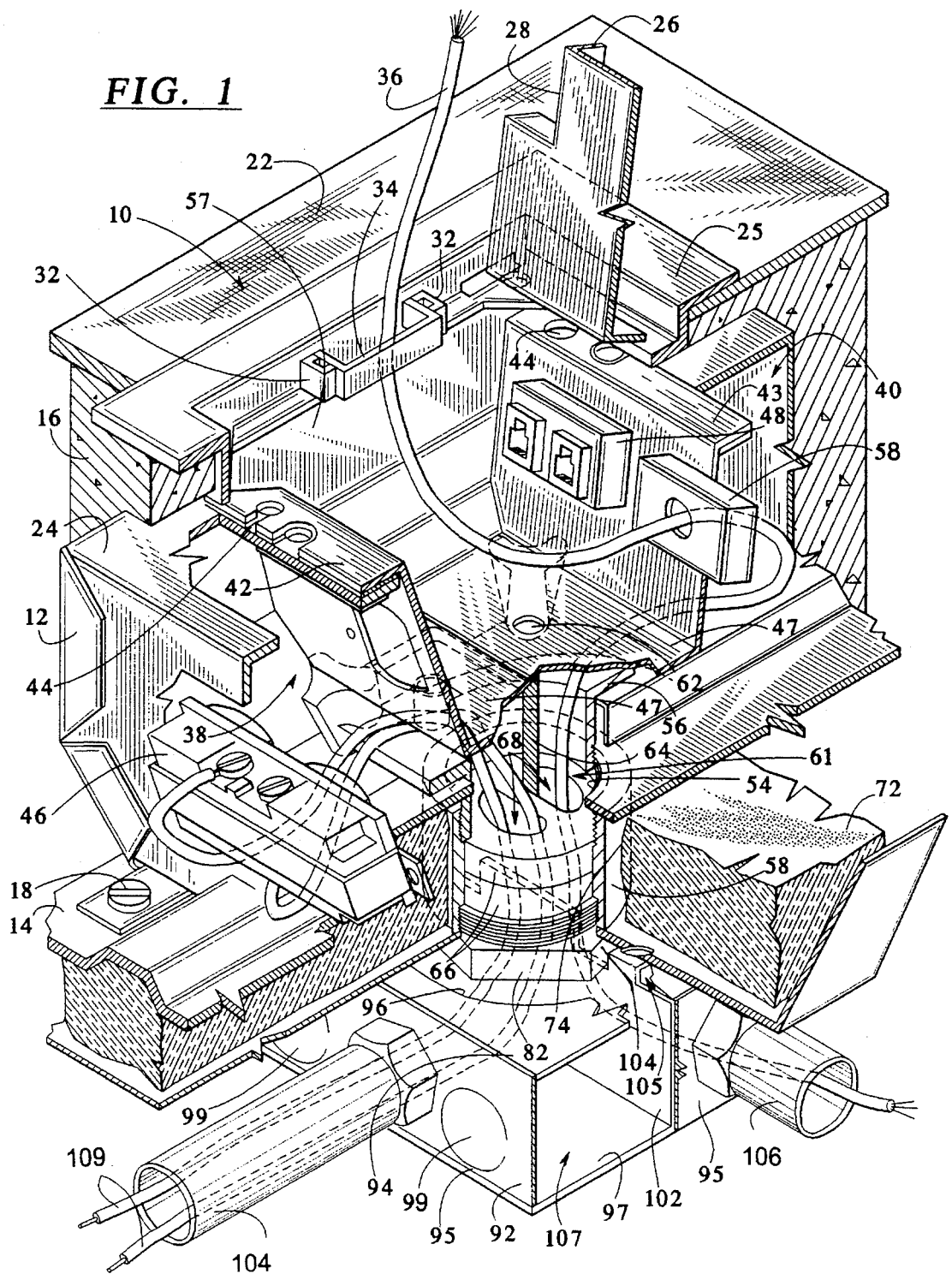
FIG. 1 is a perspective partial cut away view of an in-floor service activation assembled in a void-forming box utilized and connected to a below floor slab service distribution system in accordance with the present invention.

FIG. 1 shows an in-floor activation 10 according to the present invention providing access to services from below floor slab service distribution systems. In-floor activation 10 includes a void-forming box 12 that is positioned on a corrugated metal deck sheet 14 and is surrounded by a concrete floor slab 16. The void-forming box 12 is secured to corrugated metal deck sheet 14 by screws 18 and extends away from corrugated metal deck sheet 14 toward the floor surface 22 of the concrete floor slab 16. The void-forming box 12 has a top 24 that is below the floor surface 22. The in-floor activation 10 includes an activation frame 25 that extends to the top 24 of the void-forming box 12 from the floor surface 22 and defines an opening to the interior of the void-forming box 12.

Figure 2:
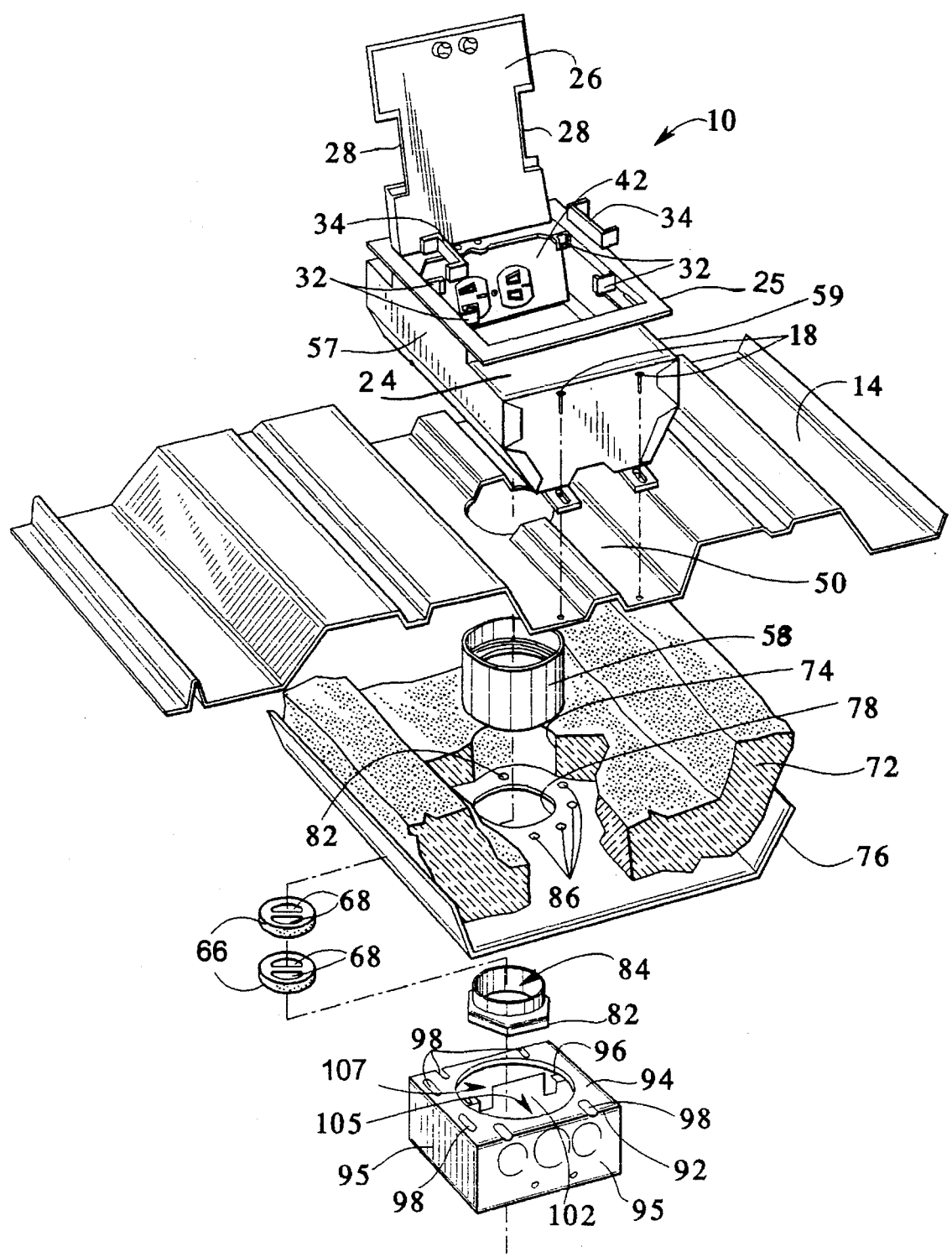
FIG. 2 is a perspective, exploded view of an in-floor activation, void-forming box, and assembly utilized for connecting the in-floor activation to below floor slab service distribution systems according to the present invention.
Figure 3:
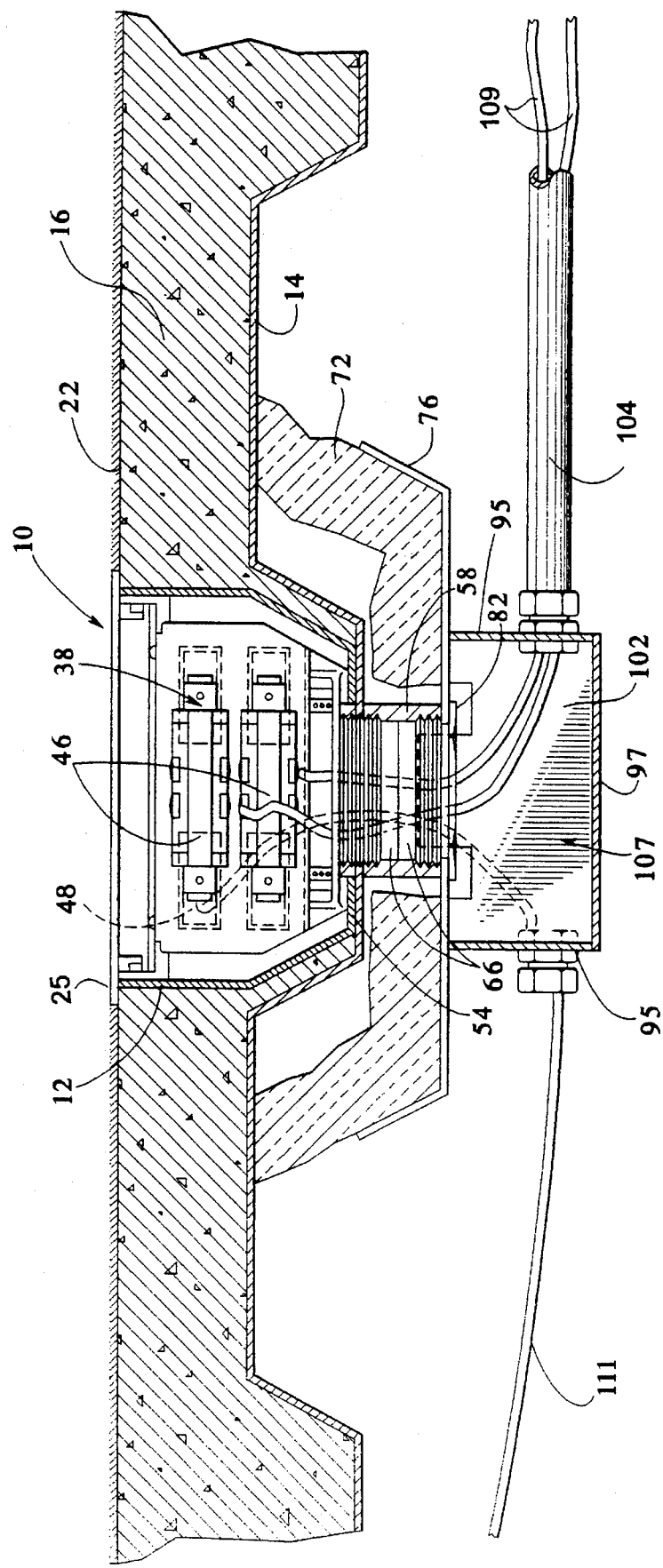
FIG. 3 is a cross-section side view of an in-floor service activation, void-forming box and an assembly for connecting the below floor slab service distribution systems with the activation.

A cover 26 is mounted to the frame 25 by a hinged connection allowing the cover 26 to pivot from an open position, shown by FIGS. 1 and 2, allowing access to the interior of the void-forming box 12 through the opening defined by the frame 25, to a closed position, shown by FIG. 3, closing the opening defined by in the frame 25. The cover 26 defines wire openings 28 on opposed sides of the cover 26. In the closed position, the wire openings 28 are adjacent to the frame 25 and provide access to the interior of the void-forming box 12 from above the floor surface 22. Tabs 32 extend from spaced apart locations on opposed sides of the frame 25 into the wire openings 28, as best shown by FIGS. 1 and 2. Wire management blocks 34 are sized to be positioned in the wire openings 28 and constructed to removably engage tabs 32 to secure cables, such as low tension cable 36 shown in FIG. 1, adjacent to the frame 25.

Cables are routed into the interior of the void-forming box 12 through from above the floor surface 22 through openings defined by the wire management block 34 and the frame 25, as shown by FIG. 1. Cables are positioned against frame 25 between tabs 32 and a wire management block 34 is installed to engage tabs 32 and secure cables, such as low tension cable 36 shown by FIG. 1, against the frame 25.

Cables secured by wire management blocks 34 may have connectors that engage connectors mounted in the in-floor activation 10, or may be routed through the in-floor activation 10 to a below floor slab distribution system, as illustrated by cable 36 on FIG. 1.

Mounting plates 42 and 43 are secured to the top 24 by screws 44, as shown by FIG. 1. Mounting plates 42 and 43 extend into the interior of the void-forming box 12 from opposed edges of an activation opening in the top 24. The mounting plates 42 and 43 are spaced apart from the void-forming box 12 to provide a space between the mounting plates 42 and 43 and the void-forming box 12 through which conductors may be routed to connectors 46 and 48 mounted to mounting plates 42 and 43. Mounting plates 42 and 43 are formed to position connectors, such as duplex power connector 46, and telephone connectors 48 and conductor guides such as guide 52 within the void box 12 and extend into the space between the mounting plates 42 and 43 and the void-forming box 12. The mounting plates 42 and 43 are separated by a distance that allows connectors to extending into the space between the opposed mounting plates 42 and 43 and allow cables to be routed from the connectors through wire management blocks 34 without interfering with connectors extending from the opposed mounting plate. The opening in the top 24 of the void box 12 is sized to allow mounting plates 42 and 43 with connectors 46, and 48 and conductor guide 52 mounted thereon to be positioned within void box 12.

Conductors are routed into void-forming box 12 from below floor slab service distribution systems through a box adapter 56 positioned in an activation opening 54 in the corrugated metal deck sheet 14. As shown by FIGS. 1 and 3, the box adapter 56 overlies a section of corrugated metal deck sheet 14 adjacent to activation opening 54 in the metal deck sheet 14 and has a cylindrical externally threaded section that extends below the corrugated metal deck sheet 14. The threaded section of box adapter 56 that extends below corrugated metal deck sheet 14 engages conduit coupler 58. The cylindrical threaded section of the box adapter 56 and a partition 64 in the threaded section define two passages that communicate with the interior of the void-forming box 12 and extend through the threaded section below the metal deck sheet 14 to communicate with the interior of the conduit coupler 58. The partition 64 extends into the interior of the void-forming box beyond the section of the box adapter 56 overlying the metal deck sheet 14.

As best shown by FIGS. 1 and 2, the mounting plates 42 and 43 are formed to extend across the sides 57 and 59 of the void-forming box 12 and from the top 24 into the interior of the void-forming box 12 toward the metal deck sheet 14 to a location adjacent to the box adapter 56. Lower flanges 45 and 47 of the mounting plates 42 and 43, respectively, extend toward the opposed mounting plate, overlie the box adapter 56 and abut each other and partition 64, as shown by FIG. 1. The mounting plates 42 and 43 are supported by the box adapter 56 and are secured to the box adapter 56 by screws 62.

The lower flanges 45 and 47, the partition 64, and the section of the box adapter 56 overlying the metal deck sheet 14 define two separated passages opening into separated spaces 38 and 40 defined by the void-forming box 12 and the mounting plates 42 and 43 respectively. Each passage communicates with one of the separated passages, 38 or 40, extending through the box adapter 56 to the conduit coupler 58. As shown by FIG. 1, high voltage connectors such as power connector 46 may be mounted to one plate 42, and low voltage connectors, such as telephone connectors 48 mounted to the other plate, 43. Conductors routed to the high voltage connectors on the mounting plate 42, such as power conductors 109, are separated from conductors, such as cable 36 routed to the low voltage connectors on the mounting plate 43.

The conduit coupler 58 defines a coupler passage 61 and has internal threads at opposed ends of the coupler passage 61. The threads at one end of the coupler passage 61 engage the threaded section of the box adapter 56 extending below the deck sheet 14. The box adapter 56 and the conduit coupler 58 cooperate to secure each other against opposed surfaces of the corrugated metal deck sheet 14. The partition 64 extends along the threaded section of the box adapter 56 to abut intumescent wafers 66 that are positioned within the coupler passage 61 adjacent to the box adapter 56. The intumescent wafers 66 are flat plate-like wafers that are sized to closely fit within the coupler passage 61 and define two cable passages 68. The intumescent wafers 66 are positioned to align the cable passages, 38 or 140, 68 and position each of the passages 68 to communicate with one passage through the threaded section of the box adapter 56.

As best shown by FIGS. 1 and 2, a fire resistant fiber blanket 72, is positioned adjacent to a section of corrugated metal deck sheet 14 surrounding the activation opening 54 and extending beyond the section of the metal deck sheet 14 bounding the interior of the void-forming box 12. The conduit coupler 58 extends through a central opening 74 of the blanket 72. A heat shield 76 having a conductor opening 78 that is smaller than the outer dimension of conduit coupler 58 is positioned with align opening 78 with the coupler passage 61. The heatshield 76 abuts an end of the conduit coupler 58 opposite the metal deck sheet 14. The heat shield 76 is formed to generally conform to a section of the metal deck sheet 14 adjacent to the fiber blanket 72. The heat shield 76 and metal deck sheet 14 are separated by the length of the conduit coupler 58. The fiber blanket 72 is of thickness approximately equal to the length of the conduit coupler 58 and fills the space between the heat shield 76 and metal deck sheet 14.

A locknut coupler 82 has a flange sized to overlie the heat shield 76 adjacent to opening 78 and an externally threaded section that extends through opening 78 and engages the threads at the end of conduit coupler passage 61 abutting the heatshield 76. The threaded section of locknut coupler 82 abuts an intumescent wafer 66 securing intumescent wafers 66 in the coupler passage 61. A conductor passage 84 extends through the locknut coupler 82 communicating with the coupler passage 61. As best shown by FIG. 3, the flange of locknut coupler 82 and the conduit coupler 58 cooperate to secure heat shield 76 between the flange of the locknut coupler 82 and the end of conduit coupler 58 opposite corrugated metal deck sheet 14.

An extension box 92 is secured to the heat shield 76 adjacent to the conductor opening 78. As shown by FIG. 2, the extension box 92 has a top 94 defining an activation opening 96 sized to surround the flange of the locknut coupler 82. The top 94 is positioned abutting the heat shield 76 so that mounting slots 98 are positioned adjacent mounting holes 86 in the heat shield 76. Screws (not shown) extend through slots 98 and engage mounting holes 86 securing the extension box 92 to the heat shield 76. The extension box 92 has sides 95 extending from the top 94 away from the heat shield 76 to lower edges. The sides 95 define a continuous side boundary of the extension box 92. An extension box cover 97 is secured to the extension box 92 overlying the lower edges of the sides 95. The sides 95 include conventional conduit knock-outs 99 that can be removed for connection of the extension box 92, in a conventional manner to conduit of below floor slab service distribution systems.

As shown by FIG. 1, a box partition 102 is positioned within the extension box 92 separating the interior of the extension box 92 into two service sections 105 and 107. The box partition 102 is secured to the heat shield 76 by screws 104 as shown by FIG. 1. A section of partition 102 extends into coupler passage 84 to abut the lower intumescent wafer 66 in coupler passage 61. Partition 102 is aligned with intumescent wafers 66 so that each service section 105 and 107 of extension box 92 communicates with an activation opening 68 and intumescent wafers 66.

As shown by FIGS. 1 and 3, the partition 102 may be used to separate the interior of extension box 92 into a power, or high voltage, section 107 and a low voltage section 105. A power conduit 104 of a below floor slab power distribution system is attached to the extension box 92 at the location of a knock-out 99 to communicate with the power section 107. Power conductors 109 are routed from the power conduit 104, through the power section 107, the locknut passage 84 and a cable passage 68 into the space 38 in void-forming box 12 adjacent to the duplex power connector 46. Similarly, a telephone cable 111 or computer data cable 36, may be routed from a computer data conduit 106 or telephone conduit 115, respectively, through the low voltage section 105, the locknut passage 84, and a cable passage 68 to the space 40 in the void-forming box 12. The cable may be routed through a cable guide 52, as shown by FIG. 1 to a location above the floor surface 22, or may be connected to a connector 48 mounted to the mounting plate 43, as shown by FIG. 3.

Figure 4:
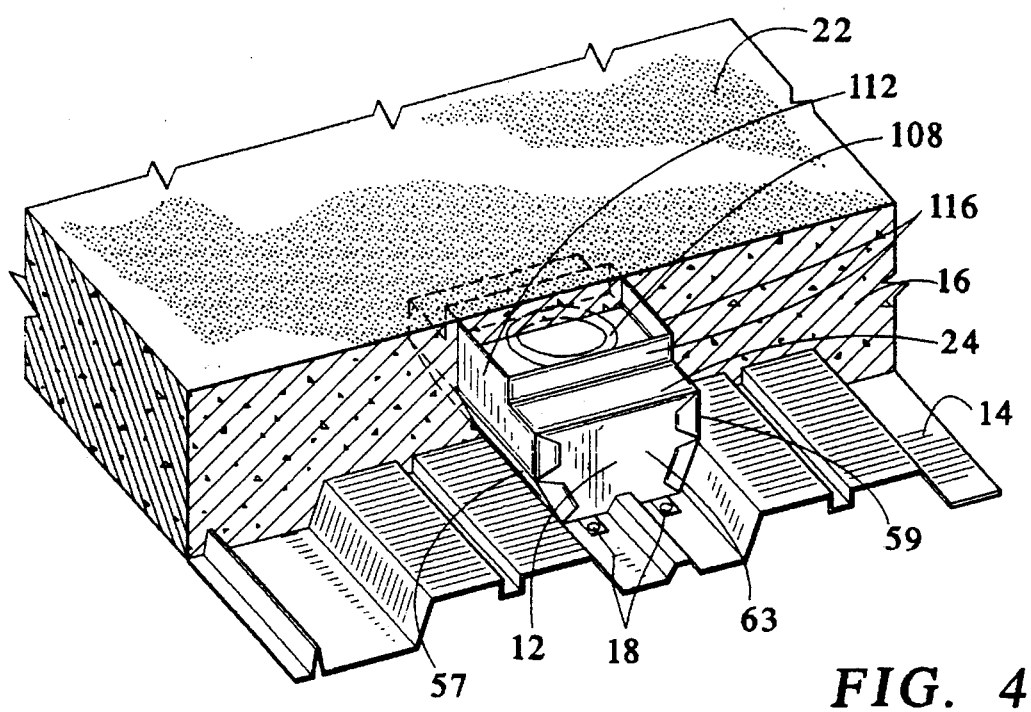
FIG. 4 is a perspective view of a void-forming box for an in-floor activation according to the present invention shown mounted on a corrugated metal deck sheet and embedded in a concrete slab (shown cut away)

A significant advantage of activation of services by the present invention is that little expense and effort is required during construction of the floor. A desired number of the void-forming boxes 12 are positioned at spaced apart locations on the corrugated metal deck sheet 14 before the concrete floor slab 16 is poured. A void-forming box 12 may be secured to the corrugated metal deck sheet 14 by screws 18, as shown by FIG. 4, or by spot welds or rivets. As best shown by FIG. 4, the concrete floor slab 16 overlies the corrugated metal deck sheet 14 and the void-forming box 12. The metal deck sheet 14 is a conventional corrugated metal deck sheet. Lower edges of sides 57 and 59 and ends 63 conform to the deck sheet 14 defining a void-bounding region 50 adjacent to activation opening 54, FIG. 2, making the present invention compatible with conventional construction of concrete office building floors. The sides 57 and 59 and ends 63 extend away from the metal deck sheet 14 to upper edges at which they join the top 24. A removable closure 108 is positioned overlying an activation opening in the top 24. The sides 57 and 59, ends 63, top 24., and removable closure 108 prevent concrete from entering the interior of void-forming box 12 when the concrete floor slab 16 is poured and is setting.

A block of intumescent or other insulating material (not shown) is placed in the void-forming box 12 before it is secured to the metal deck sheet 14. The block of insulating material in the void-forming box 12 creates fire resistance similar to or greater than the concrete displaced by the void-forming box 12. Sprayed-on insulation is conventionally applied to the underside of the metal deck sheet 14, opposite the concrete floor slab 16. No additional sprayed on insulation or other fire resistance measures are required as a consequence of positioning the void-forming box 12 and the insulating material in the concrete floor slab 16.

A void-forming box 12 may be located and exposed after the concrete floor slab 16 has set using hand tools. The location of a void-forming box 12 may be identified by tapping the floor surface 22. The sides 57 and 59 of the void-forming box 12 and the removable closure 108 are formed to facilitate removal of concrete overlying the removable closure 108. The sides 57 and 59 of a void-forming box 12 include extensions 112 that are adjacent to the activation opening in the top 24 and extend to a location closely adjacent to the surface 22 of concrete floor 16. Closure 108 has sides 114 that extend upwardly away from top 24 to the upper extent of the side extension 112. The thin overlying layer of concrete adjacent to extensions 112 and sides 114 may be broken by hand tools and the concrete adjacent to closure 108 removed. After removal of concrete overlying the closure 108, the closure 108 and insulating block in the void-forming box 12 are removed from above the floor surface 22.

Figure 5:
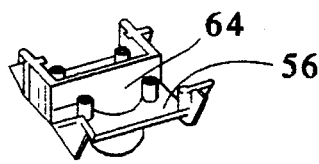
FIG. 5 is a perspective exploded view of a void-forming and activation components according to the present invention.
Figure 5:
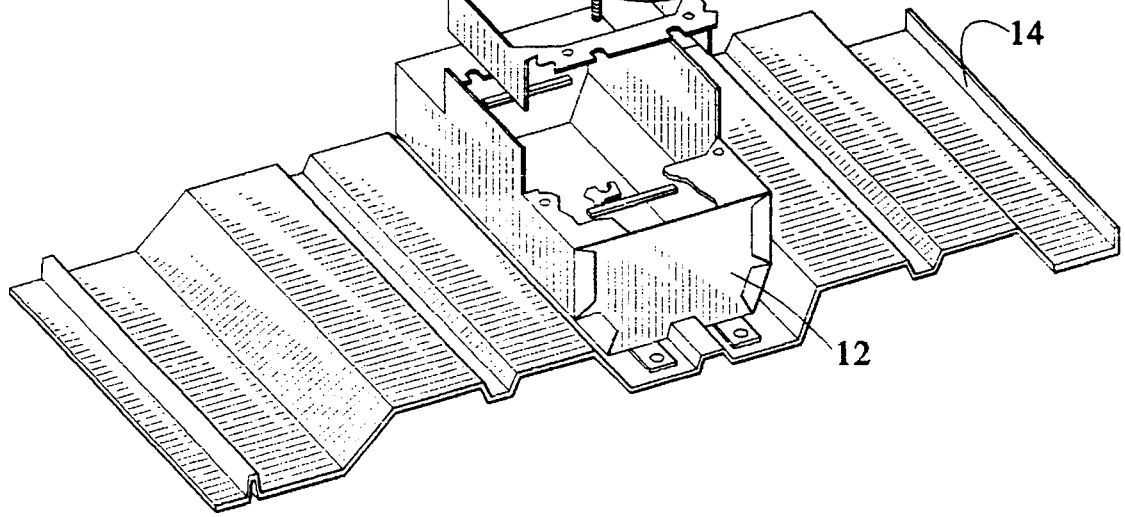

Connection to one or more below floor slab distribution systems and installation of a selected activation kit in a void-forming box 12 requires only conventional service distribution construction. The activation opening 54 is cut through the metal deck sheet 14 using a conventional hole saw from above the floor surface 22. As shown by FIG. 5, an adjusting plate 122 is positioned overlying the section of the top 24 that closure 108 overlaid and is secured to the top 24 by screws 124. The adjusting plate 122 is constructed to be attached to and provide leveling adjustment for the frame 25. The box adapter 56 is positioned within the activation opening through an opening in adjusting plate 122. The conduit coupler 58 is threaded onto box adapter 56 from below the deck sheet 14. Intumescent wafers 66 are positioned within conduit coupler 56, fiber blanket 72 positioned surrounding the conduit coupler 58, the heat shield 76 positioned against the conduit coupler 58, and the locknut coupler 82 is threaded into the conduit coupler 58 from below the metal deck sheet 14. The extension box 92 and the partition 102 are secured to heat shield 72 as described above.

Conduit of a below floor slab service distribution system is routed and connected to the extension box 92 in a conventional manner. Conductors are pulled into extension box 92 from conduit and routed through the locknut coupler 82, the conduit coupler 58, the box adapter 56, and the void-forming box 12. Conductors are attached to connectors attached to mounting plates or 42 and 43 or routed through a guide, such as 52, mounted to a mounting plate. The mounting plates 42 and 43 are then positioned in the void-forming box 12 and secured to the box adapter 56 and void-forming box 12 by screws 62. The frame 25 and cover 26 are then assembled in a conventional manner. A frame and cover which may be used with the present invention are disclosed by U.S. Pat. No. 4,864,078 which is assigned to the assignee of its application and incorporated by reference. In-floor activations 10 according to the present invention may also be assembled in void-forming boxes 12 that are connected to a below floor slab distribution system as illustrated by FIG. 6. A plurality of void-forming boxes 12 are mounted to a metal deck sheet 14, prior to pouring of concrete floor slab 16, as previously described. The void-forming boxes 12 are connected to an adjacent void forming box 12 by conduit, 132, in a conventional manner. Each conduit 132 is conventionally connected at either of its ends, to a void-forming box 12 at an end 63 or a side, 57 or 59, near an end 63. Conductors may be fed into a conduit 132 from within a void-forming box 12 through a space 38 or 40 in the void-forming box 12. One of the void-forming boxes, 12, is connected to a below floor slab distribution system, as previously described, and conductors routed to adjacent void-forming boxes 12 through conduits 132.

A void-forming box 12 connected to a below floor slab distribution system through a conduit 132 is located and opened as previously described. Conductors are routed into the opened box through conduit 132 in a conventional manner and connected to connectors mounted in the void-forming box 12 as previously described. In addition, a fire resistant insert such as an intumescent may be placed within the void forming box 12 adjacent to the metal deck sheet 14 to resist and absorb heat.

The present invention may also be used to position connectors flush with a frame and extending into the void-forming box from the floor surface 22. A frame that supports connectors generally within the plane of a floor surface and may be used in combination with the present invention is disclosed by U.S. Pat. No. 4,591,656 which is assigned to the assignee of this application and is incorporated by reference.

It will be understood that the foregoing description is for purposes of illustrating the principles of the present invention. The scope of this invention is determined, however, by reference to the following claims.

We claim:

1. An activation assembly for use with service distribution systems, including conduit carrying conductors in a space below an office building floor having a corrugated metal deck sheet and an overlying layer of concrete defining an upper floor surface, the activation assembly comprising:

a void-forming box adapted to be positioned on the corrugated metal deck sheet and having spaced apart ends and spaced apart sides joining the ends, each end having a lower edge adapted to be positioned adjacent to and adapted to conform to the corrugated metal deck sheet and each end extending toward the floor surface to a respective upper edge below the floor surface, each side having a lower edge adapted to be positioned adjacent to and adapted to conform to the corrugated metal deck sheet and extending between the lower edges of the ends, the lower edges of the ends together with the lower edges of the sides adapted to circumscribe a void-bounding region of the deck sheet, each side extending toward the floor surface to respective upper edge below and spaced apart from the floor surface and extending between the upper edges of the ends;

a top overlying the upper edges of the ends and sides and defining an activation opening sized to allow mounting hardware and connectors to be positioned in and secured to the void-forming box;

the sides, ends, and top defining an interior volume;

the interior volume sized to receive connectors and mounting hardware for connectors for one or more service and shields for separating the services;

a box adapter adapted to be positioned on the metal deck sheet in the void-forming box and adapted to extend through an activation opening in the metal deck sheet into the space below the floor, the box adapter having a conductor passage communicating with the interior volume of the void-forming box and extending through the box adapter to an opening at an end of the box adapter, the opening being adapted to be positioned in the space below the metal deck sheet; and an extension box secured to the box adapter in the space below the floor, the extension box having a top defining an opening communicating with the opening at the end of the box adapter in the space below the floor and sides adapted to be connected to conduit, sides circumscribing the boundary of the top and extending from the top away from the deck sheet to lower edges, and a cover secured to the extension box abutting the lower edges of the extension box;

the top, sides, and cover of the extension box defining a box interior that communicates with the interior of the void-forming box through the conductor passage in the box adapter, whereby conduit of the distribution systems is connected to the sides of the extension box and conductors are routed into the void-forming box through the conduit, extension box, and conductor passage of the box adapter.

2. An activation assembly for use with service distribution systems including high tension and low tension conductors carried in separate conduit located in a space below an office building floor having a corrugated metal deck sheet and an overlying layer of concrete defining an upper floor surface, the activation assembly comprising:

a void-forming box adapted to be positioned on the corrugated metal deck sheet having a continuous side wall with an upper edge and a lower edge, the lower edge adapted to conform to the corrugated metal deck sheet and defining a bottom opening adapted to circumscribe a void bounding region on the corrugated metal deck sheet;

a top overlying the upper edge of the side wall and defining an activation opening sized to allow mounting hardware and connectors to be positioned in and secured to the void-forming box;

a pair of mounting plates removably mounted in the void forming box and dividing the box into first and second sections, each of the mounting plates being configured to position electrical connectors within the void forming box;

an extension box adapted to be positioned below the metal deck sheet and overlay the void bounding region, the extension box having a side adapted to extend away from the metal deck sheet, a bottom closure removably connectable to the side, and a partition dividing the extension box into first and second sections, the extension box being adapted to connect to the conduit of the below floor distribution system to permit conductors to be routed from the conduit and into the first and second sections of the extension box;

connector means defining first and second conductor passages extending respectively between the first and second sections in the void forming box and the first and second sections in the extension box.

3. An activation assembly as set forth in claim 2, wherein the connector means further comprises a box adapter adapted to be positioned on the metal deck sheet in the void-forming box and adapted to extend through an activation opening in the metal deck sheet.

4. An activation assembly as set forth in claim 2, further comprising an intumescent wafer positionable in the connector means.

5. An activation assembly in combination with a corrugated metal sheet, the combination being adapted for use with a service distribution system of the type including conduit for carrying conductors in a space below an office building floor, the floor including a layer of concrete overlying the metal deck sheet and defining an upper floor surface, the combination comprising:

a corrugated metal deck sheet having an activation opening;

a void-forming box positioned on the corrugated metal deck sheet having a continuous side wall with an upper edge and a lower edge, the lower edge conforming to the corrugated metal deck sheet and defining a bottom opening circumscribing a void bounding region on the corrugated metal deck sheet overlaying the activation opening;

a top overlying the upper edge of the side wall and defining an activation opening sized to allow mounting hardware and connectors to be positioned in and secured to the void-forming box;

a removable closure member overlying the activation opening;

the corrugated deck sheet, sides, ends, top, and closure member defining an interior volume and preventing concrete from entering the interior volume during pouring and setting of the concrete floor;

the interior volume sized to receive connectors and mounting hardware for connectors for one or more service and shields for separating the services;

a box adapter positioned on the metal deck sheet in the void-forming box and extending through the activation opening in the metal deck sheet into the space below the floor, the box adapter having a conductor passage communicating with the interior volume of the void-forming box and extending through the box adapter to an opening at an end of the box adapter in the space below the metal deck sheet; and an extension box secured to the box adapter in the space below the floor, the extension box having a top, sides and a bottom, the top defining an opening communicating with the opening at the end of the box adapter, the sides adapted to be connected to conduit and circumscribing the boundary of the top and extending from the top away from the deck sheet to lower edges, the bottom being securable to the lower edges of the sides; and the top, sides, and bottom of the extension box defining a box interior that communicates with the interior of the void-forming box through the conductor passage in the box adapter, whereby conduit of the distribution systems is connected to the sides of the extension box and conductors are routed into the void-forming box through the conduit, extension box, and conductor passage of the box adapter.

* * * * *